United States Patent
Bres et al.

(10) Patent No.: US 7,641,719 B2
(45) Date of Patent: Jan. 5, 2010

(54) APPARATUS FOR THE SEPARATION OF AT LEAST ONE CONSTITUENT OF A GAS MIXTURE BY PRESSURE SWING ADSORPTION

(75) Inventors: Jérôme Bres, Paris (FR); Xavier Vigor, Paris (FR); Sylvain Fourage, Issy les Moulineaux (FR); Anne Barbier, La Tronche (FR)

(73) Assignee: L'Air Liquide - Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 576 days.

(21) Appl. No.: 10/560,467

(22) PCT Filed: Jun. 18, 2004

(86) PCT No.: PCT/FR2004/050282

§ 371 (c)(1),
(2), (4) Date: Nov. 30, 2006

(87) PCT Pub. No.: WO2005/005023

PCT Pub. Date: Jan. 20, 2005

(65) Prior Publication Data

US 2007/0056442 A1 Mar. 15, 2007

(30) Foreign Application Priority Data

Jul. 2, 2003 (FR) .................................. 03 08029

(51) Int. Cl.
*B01D 53/02* (2006.01)
(52) U.S. Cl. .......................................... 96/108; 96/130
(58) Field of Classification Search ................. 96/108, 96/130; 95/96
See application file for complete search history.

(56) References Cited

U.S. PATENT DOCUMENTS

| 5,176,721 A | 1/1993 | Hay et al. |
| 6,555,385 B1 * | 4/2003 | Honda et al. ................. 436/178 |
| 2008/0028933 A1 * | 2/2008 | Ross et al. ..................... 95/138 |

FOREIGN PATENT DOCUMENTS

EP   1 080 772   3/2001

* cited by examiner

*Primary Examiner*—Robert A Hopkins
(74) *Attorney, Agent, or Firm*—Elwood L. Haynes

(57) ABSTRACT

The gas separation apparatus comprises a flexible wall which is maintained in a placed position on an upper end of an adsorbant material; the volume between the wall and an upper dome communicates with one of inner and outer chambers on both sides of the adsorbant (4). The invention can be used to separate air components.

11 Claims, 2 Drawing Sheets

APPARATUS FOR THE SEPARATION OF AT LEAST ONE CONSTITUENT OF A GAS MIXTURE BY PRESSURE SWING ADSORPTION

BACKGROUND

The present invention relates to apparatus for separating at least one component of a gas mixture by pressure swing adsorption of the type called "PSA" or "VSA", comprising, in a generally vertical vessel comprising an upper dome, at least one adsorbent mass separating a first vertical chamber receiving the gas mixture to be separated, from a second vertical chamber collecting a separated gas mixture, a generally horizontal flexible wall being pressed against the upper end of the adsorbent mass by pressing means.

An apparatus of this type is described in document U.S. Pat. No. 5,176,721 (Hay/Vigor), in the name of the Applicant. In this type of apparatus, in which the gases flow horizontally, the packing membrane separates an upper volume at substantially constant pressure from lower volumes which are alternately subject to sometimes significant pressure variations. This generates a fatigue load on the structural parts of the apparatus (in practice: weld-fabricated metal parts such as grilles, sheets, plates, shells, tubes, ends) which require oversizing (thickness, weld classes, accuracy of adjustments) considerably increasing the manufacturing and installation costs.

SUMMARY

The object of the present invention to propose design of apparatus that not only allows the manufacturing and assembly costs to be reduced, but also allows the existing sets of apparatus to be reconditioned in order to significantly lengthen their operational life.

For this purpose, according to one feature of the invention, the apparatus comprises means for controlling the pressure in the volume between the flexible wall and the dome.

According to more particular features of the invention:
the upper volume between the flexible wall and the dome communicates with one of said first and second chambers,
the apparatus further comprises means for ballasting the flexible wall,
the apparatus comprises a line connecting the upper volume to the second chamber,
the apparatus comprises a passage between the volume and the first chamber,
the adsorbent mass is annular, and the first and second chambers are concentric.

With the arrangement according to the invention, the pressure in the upper volume is no longer constant but is controlled as a function of the process pressures in the adsorbent, typically balanced with one of the operating pressures upstream or downstream of the adsorbent, thereby substantially eliminating the undesirable loads hitherto transmitted by the flexible wall to the rest of the structure of the apparatus.

Furthermore, the line or the communicating passage can be arranged without any substantial change in the existing apparatus architectures.

BRIEF DESCRIPTION OF THE DRAWINGS

Other features and advantages of the present invention will appear from the following description of embodiments, provided for illustration but in no way limiting, with reference to the appended drawings, in which.

DETAILED DESCRIPTION

Figure 1:
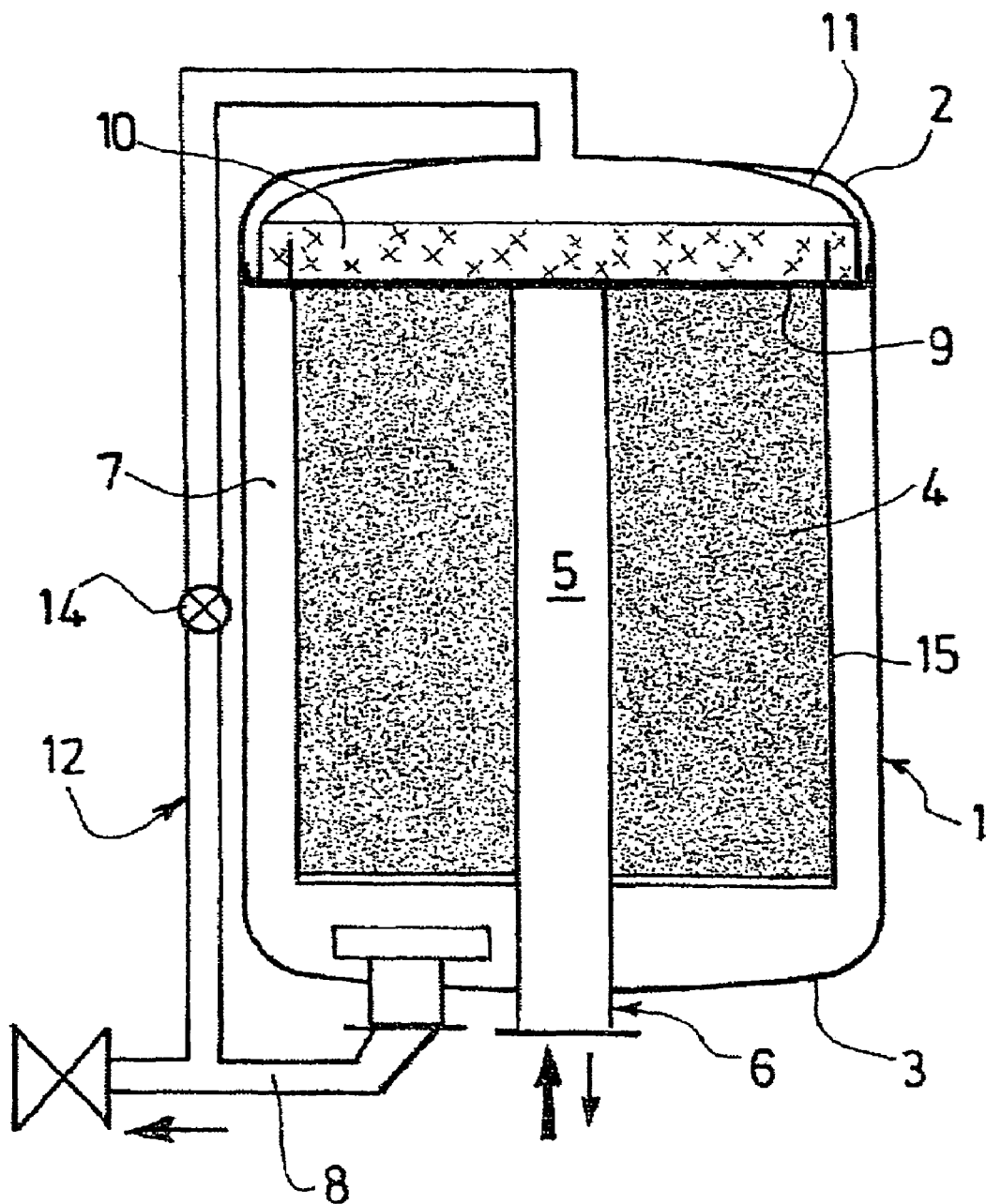
FIG. 1 shows a vertical section of a first embodiment of an apparatus according to the invention.

The embodiment shown in FIG. 1 shows a radial adsorber with, in a cylindrical vessel 1 with a vertical axis comprising an upper dome 2 and a bottom end 3, at least one annular adsorbent mass 4, coaxial with the axis of the vessel 1, by a lower chamber 5 formed by a perforated central tube 6 coaxial with the axis of the vessel 1, from a peripheral chamber 7 communicating with the lower volume of the vessel 1 from which, in the production phase, issues an outlet line 8 for the production gas mixture separated from a feed gas mixture introduced via the lower end of the central tube 6. In the regeneration phase, the adsorbent mass 4 is flushed by a gas mixture escaping with reduced pressure, via the same lower end of the central tube 6. The adsorbent is maintained externally and separated from the peripheral chamber 7 by at least one perforated shell 15 coaxial with the axis of the vessel 1.

In a manner known per se, an impermeable flexible wall or membrane 9 extends horizontally in the vessel 1 to cover the upper ends of the annular chamber 7, of the annular adsorbent mass 4, and of the central tube 5.

In the embodiment shown, the membrane 9 is covered with at least one bed 10 of individual or particulate elements forming a ballast, such as metal, glass or ceramic beads, and the upper part of the volume between the dome 2 and the membrane 9 is occupied by a skin 11 communicating, via an external line 12 passing through the dome 2, with the production gas line 8. The line comprises a solenoid valve 14 for adjusting the pressure in the dome 2 as a function of the process parameters. In this embodiment, the pressure on the upper part of the membrane 9 substantially "follows" the pressure of the production gas mixture while simultaneously, at any time in the cycle, remaining not lower than the maximum process gauge pressure in the adsorbent 4.

As a variant, the line 12 may simply terminate in the top of the dome 2 to directly pressurize the upper volume above the membrane 9, most of this internal volume being occupied by particulate materials of lower density than the particulate materials ballasting the membrane 9 and superposed thereon.

Figure 2:
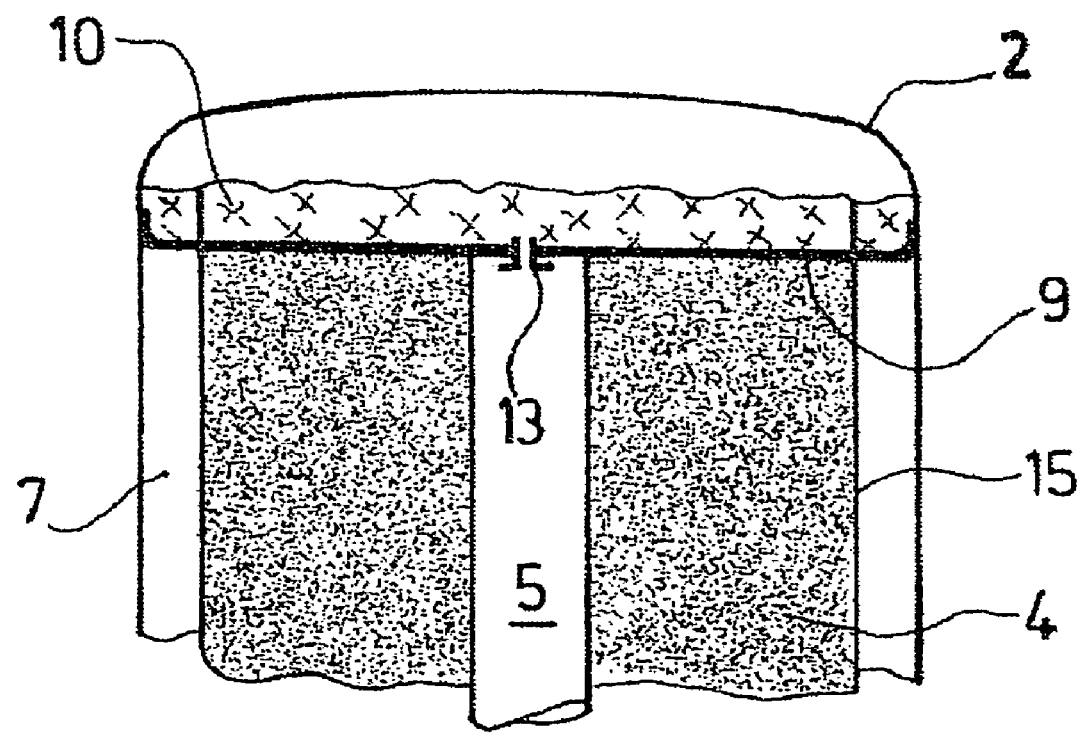
FIG. 2 shows a partial vertical section of a second embodiment of an apparatus according to the invention.

In the embodiment in FIG. 2, the volume above the membrane 9 communicates permanently, via at least one calibrated passage 13, with the internal chamber 5 and thereby "follows" the pressure in this internal chamber 5.

The present invention is ideal for apparatus for separating components of air, particularly for supplying oxygen more than 90% pure. In this case, the adsorbent 4 contains at least one zeolite, advantageously of the LSX type, advantageously an LiLSX zeolite, the membrane 9 being made from the material marketed under the name "Hypalon" and/or from neoprene. Although the invention has been described with reference to particular embodiments, it is not limited thereto but is suitable for modifications and variants that will appear to a person skilled in the art in the context of the claims below.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for separating at least one component of a gas mixture by pressure swing adsorption, comprising:
   an upper dome (2);
   a bottom end (3);
   generally vertically extending walls extending from the bottom end (3) to the upper dome (2) thereby enclosing a space;
   a first vertical chamber (5) adapted and configured to receive the gas mixture to be separated;
   a second vertical chamber (7) adapted and configured to collect a separated gas mixture;
   at least one adsorbent mass (4) separating the first and second vertical chambers;
   a ballast (10);
   a generally horizontal flexible wall (9) extending underneath the ballast;
   a skin (11) extending underneath the upper dome (2) over the ballast (10) and resting upon peripheral portions of the wall (9), the wall (9) being pressed down against an upper end of the adsorbent mass (4) by the weight of the ballast (10) and skin (11);
   a volume between the flexible wall (9) and the dome (2); and
   an element in fluid communication with the volume and being adapted and configured to control a pressure in the volume.

2. The apparatus of claim 1, wherein the volume is in fluid communication with one of said first and second chambers.

3. The apparatus of claim 2, wherein the element comprises a line (12) connecting said volume to the second chamber (7).

4. The apparatus of claim 2, wherein the element comprises an aperture in the wall forming a passage (13) between said volume and the first chamber (5).

5. The apparatus of claim 1, wherein:
   the adsorbent mass (4) is annular; and
   the first (5) and second (7) chambers are concentric with respect to each other.

6. The apparatus of claim 1, wherein the adsorbent mass comprises at least one zeolite.

7. An apparatus for separating at least one component of a gas mixture by pressure swing adsorption, comprising:
   an upper dome;
   a bottom end;
   generally vertically extending walls extending from the bottom end to the upper dome thereby enclosing a space;
   a first vertical chamber adapted and configured to receive the gas mixture to be separated;
   a second vertical chamber adapted and configured to collect a separated gas mixture;
   at least one adsorbent mass separating the first and second vertical chambers;
   a generally horizontal flexible wall extending underneath the ballast;
   a means for pressing, the means far pressing being adapted and configured to press the wall down against an upper end of the adsorbent mass;
   a volume between the flexible wall and the dome; and
   a means for controlling pressure in fluid communication with the volume and being adapted and configured to control a pressure in the volume.

8. The apparatus of claim 7, wherein said means for controlling pressure is also in fluid communication with one of said inner and outer chambers.

9. An apparatus for separating at least one component of a gas mixture by pressure swing adsorption, comprising:
   a generally vertically vessel comprising a bottom end, an upper dome and vessel walls extending between said bottom end and said dome thereby enclosing a space, said dome having an aperture therethrough;
   an annular perforated shell disposed inside said space, said shell containing an adsorbent mass, outer portions of the shell and inner surfaces of the bottom end, upper dome, and vessel walls defining an outer chamber;
   an outlet line extending into the outer chamber and being adapted and configured to collect gas separated by the adsorbent mass from the gas mixture to be separated;
   a perforated central tube extending vertically through said shell defining an inner chamber and being adapted and configured to receive the gas mixture to be separated;
   a generally horizontal wall extending between said vessel walls and resting upon said shell and adsorbent mass, said horizontal wall and said upper dome defining a volume;
   a mass of solid ballast material resting upon said generally horizontal wall; and
   an external line in fluid communication with said aperture and volume and said outlet line.

10. An apparatus for separating at least one component of a gas mixture by pressure swing adsorption, comprising:
    a generally vertically vessel comprising a bottom end, an upper dome and vessel walls extending between said bottom end and said dome thereby enclosing a space;
    an annular perforated shell disposed inside said space, said shell containing an adsorbent mass, outer portions of the shell and inner surfaces of the bottom end, upper dome, and vessel walls defining an outer chamber;
    an outlet line extending into the outer chamber and being adapted and configured to collect gas separated by the adsorbent mass from the gas mixture to be separated;
    a perforated central tube extending vertically through said shell defining an inner chamber and being adapted and configured to receive the gas mixture to be separated;
    a generally horizontal wall extending between said vessel walls and resting upon said shell and adsorbent mass, said horizontal wall and said upper dome defining a volume;
    a mass of solid ballast material resting upon said generally horizontal wall; and
    a calibrated aperture formed in said horizontal wall thereby providing fluid communication between said inner chamber and said ballast material.

11. An apparatus of claim 10 further comprising a mass of solid low density material over said ballast material, said mass of low density material taking up a majority of said volume, the low density material having a density lower than that of said ballast material.

* * * * *